No. 736,191. PATENTED AUG. 11, 1903.
F. BAHLER.
DRAFT EQUALIZER.
APPLICATION FILED JAN. 15, 1903.
NO MODEL.
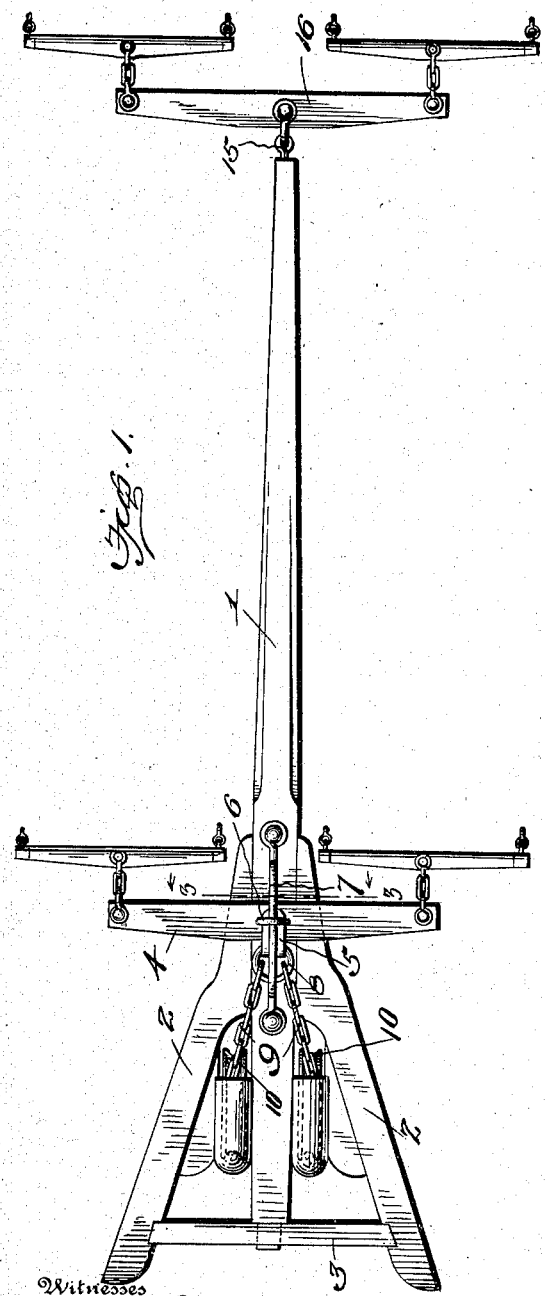
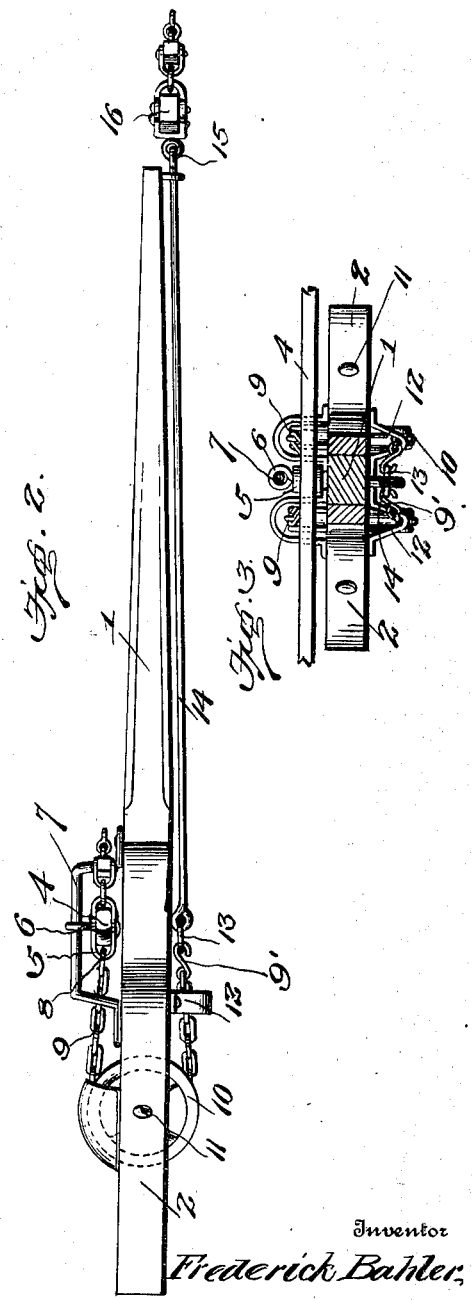
Inventor
Frederick Bahler,
Witnesses
By
Attorneys No. 736,191. Patented August 11, 1903.

UNITED STATES PATENT OFFICE.

FREDERICK BAHLER, OF SPOKANE, WASHINGTON.

DRAFT-EQUALIZER.

SPECIFICATION forming part of Letters Patent No. 736,191, dated August 11, 1903.

Application filed January 15, 1903. Serial No. 139,174. (No model.)

*To all whom it may concern:*

Be it known that I, FREDERICK BAHLER, a citizen of the United States, residing at Spokane, in the county of Spokane and State of Washington, have invented certain new and useful Improvements in Draft-Equalizers; and I do declare the following to be a full, clear, and exact description of the invention, such as will enable others skilled in the art to which it appertains to make and use the same.

This invention relates to improvements in draft-equalizers, and particularly to four-horse equalizers in which the horses are arranged in pairs—one pair in advance or in front of the other.

The object is to produce an equalizer of this character whereby the draft upon the front and rear pairs of horses will be the same.

A further object is to construct an equalizer which will be simple in construction, strong and durable in use, efficient, and well adapted to the use for which it is designed.

With these and other objects in view the invention consists in the construction and arrangement of the parts, as will be hereinafter more fully described and claimed, reference being had to the accompanying drawings, in which—

Figure 1 is a top plan view of a wagon-tongue, showing the application of the invention. Fig. 2 is a side view of the same. Fig. 3 is a vertical cross-sectional view on the line 3 3 of Fig. 1.

In the drawings, 1 denotes a wagon-tongue, to the inner end of which is attached diverging braces 2, connected at their free ends by a cross-brace 3.

4 denotes a whiffletree arranged at the inner end of the tongue and to which is attached the usual swingletrees. 5 denotes the clevis at the center of the whiffletree, and 6 denotes the pin or bolt which fastens the clevis to the whiffletree. The said pin is headed on its lower end or provided with a nut to prevent its withdrawal. The upper end of said pin is provided with an eye which slidably engages a yoke or bail 7, whereby said whiffletree is pivotally supported or suspended.

The yoke or bail 7 consists of a horizontally-disposed bar or rod having downwardly and outwardly bent ends, eyes being formed in said outwardly-bent portions of the ends whereby said bail is bolted to the tongue of the wagon.

To the rear side of the clevis is attached a ring 8, to which is connected the ends of two chains 9, which extend rearwardly and pass over grooved pulleys 10, which are arranged one on each side of the inner end of the tongue between the same and the braces 2. The pulleys 10 are journaled upon a shaft or bolt 11, which passes through the tongue and through the braces 2. The pulleys 10 are provided on their upper sides with guards which prevent dirt from falling in the grooves and clogging the chains and also serve to hold the chains in place on the pulleys.

The chains 9 after passing around the pulleys extend forwardly and pass through a guide-bracket 12, fixed to the under side of the tongue. The ends of the chains are now brought together and connected by means of hooks 9' to a ring 13, which in turn is connected to an eye formed in the inner end of a rod 14, which is arranged beneath and in line with the tongue.

On the outer end of the rod 14 is formed an eye 15, to which is connected the clevis of a forward whiffletree 16, to the ends of which are connected the usual swingletrees for the forward team of horses.

By the construction and arrangement of the parts as herein shown and described it will be seen that a free swinging and sliding movement is given to the rear whiffletree-bar, so that any undue lurching or jerking on the part of the horses or wagon will not break any of the parts. The guide-brackets 12, fixed beneath the tongue, serve to hold the chains in place upon the lower sides of the pulleys.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

In a draft-equalizer the combination of a tongue, a longitudinally-disposed yoke attached thereto, a front whiffletree, a rear whiffletree suspended from the yoke, pivotally connected thereto and slidable longitudinally thereon, a guide element in rear of the rear whiffletree and a connection between the whiffletree and engaged with said guide element, substantially as described.

In testimony whereof I have hereunto set my hand in presence of two subscribing witnesses.

FREDERICK BAHLER.

Witnesses:
HARRY WILLIAMS,
W. L. JACKSON.